May 13, 1969   E. A. VON SEGGERN ET AL   3,443,552
INTERNAL COMBUSTION ENGINE, FUEL SUPPLY SYSTEM AND PROCESS
Filed Dec. 13, 1966
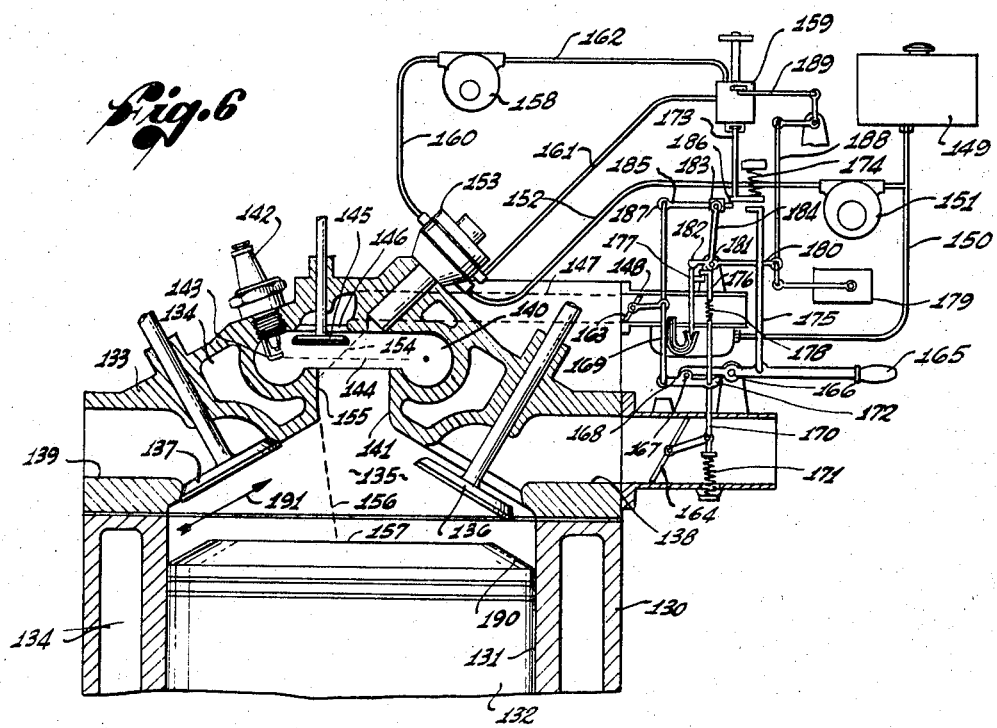
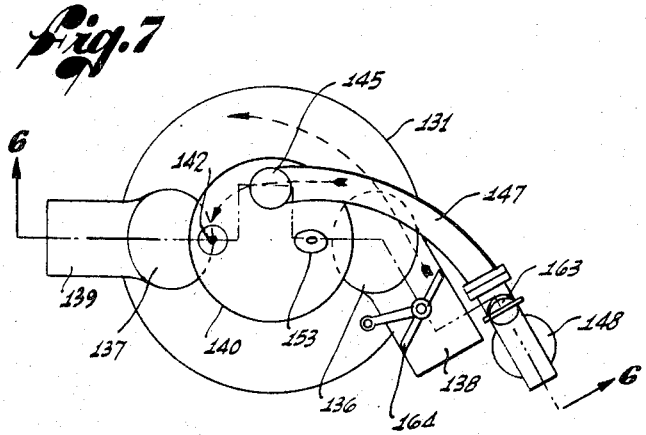
ERNEST A. VON SEGGERN.
HENRY E. VON SEGGERN
INVENTORS
BY
ATTORNEY

United States Patent Office 3,443,552
Patented May 13, 1969

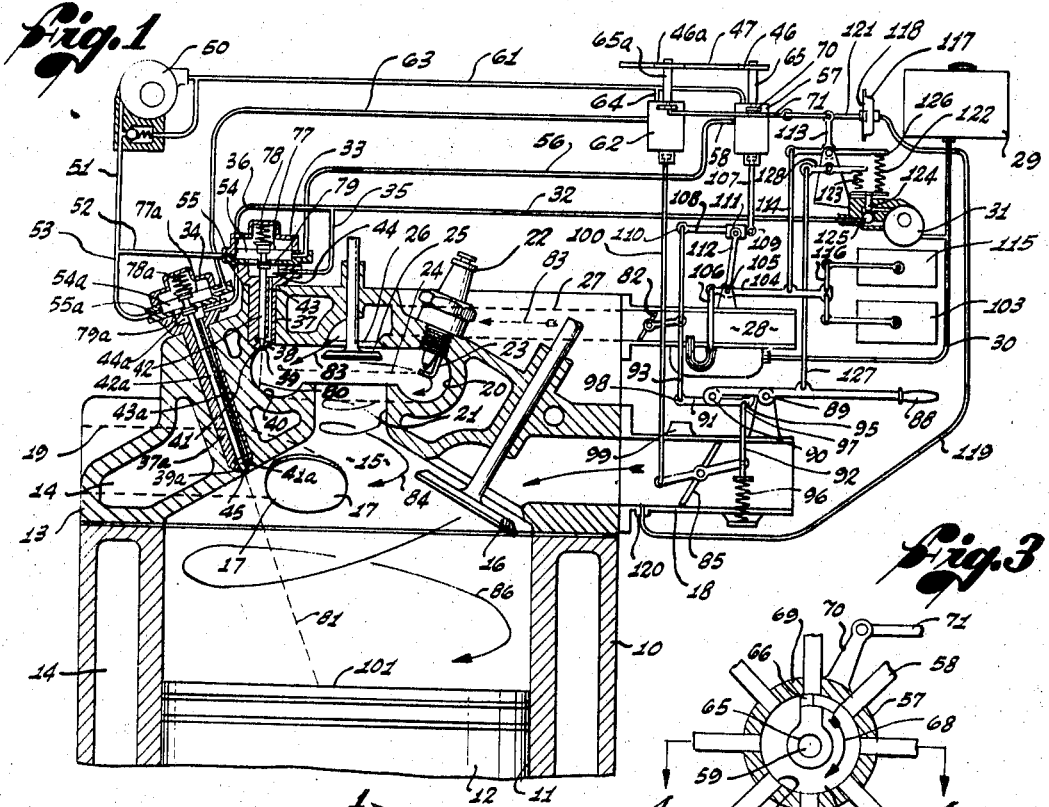

3,443,552
INTERNAL COMBUSTION ENGINE, FUEL SUPPLY SYSTEM AND PROCESS
Ernest A. von Seggern, 1051 E. Angeleno, Burbank, Calif. 91501, and Henry E. von Seggern, Rte. 2, Box 1910, Escondido, Calif. 92025
Continuation-in-part of applications Ser. No. 369,091, May 21, 1964, Ser. No. 398,219, Sept. 22, 1964, Ser. No. 451,720, Apr. 29, 1965, Ser. No. 466,352, June 23, 1965, Ser. No. 494,653, Oct. 11, 1965, and Ser. No. 553,425, May 27, 1966. This application Dec. 13, 1966, Ser. No. 601,481
Int. Cl. F02b *19/08, 23/10, 15/00*
U.S. Cl. 123—32                                14 Claims

ABSTRACT OF THE DISCLOSURE

An engine of the spark ignition type, with fuel injection and throttled air supply, is provided in which heated auxiliary air is added to the combustion substantially during the time of maximum temperature and pressure in the engine cycle. The fuel, which is delivered to the engine in a liquid, unatomized state during any time between the beginning of the intake cycle to the end of the compression cycle (depending on operating conditions) is heated, while in the liquid state in the presence of air prior to the initiation of combustion and is subsequently burned in a flame induced, progressive surface combustion reaction in conjunction with heated auxiliary air in which the combustion takes place in a localized manner and progresses from an initial reaction with an excess of fuel to a final reaction with an excess of air. Means for establishing the surface type combustion include an ignition chamber of toroidal design, combined with an organized circulation of working fluid in the cylinder, and a non-atomizing fuel supply system which delivers liquid fuel to the top of the piston in variable quantity and at variable time prior to ignition. A dual fuel injection and a single fuel injection system are shown, combined with means for providing a pre-mixed fuel-air mixture for starting the engine. The engine is designed primarily to operate with white (unleaded) fuel such as gasoline, at high compression and power is controlled by varying both the quantity of fuel injected and the air supplied thereto.

---

This application is a continuation-in-part of our prior co-pending applications, as follows: Ser. No. 369,091, filed May 21, 1964, now abandoned, entitled "Internal Combustion Engine Process and Apparatus Using Toroidal Ignition Chamber"; Ser. No. 398,219, filed Sept. 22, 1964, now abandoned, entitled "Mixture Separation Means and Fuel Supply Means for Excess Air Cycle Engine"; Ser. No. 451,720, filed Apr. 29, 1965, now Patent No. 3,363,111, entitled "Full Pressure Cycle Engine With Excess Air"; Ser. No. 466,352, filed June 23, 1965, now abandoned, entitled "Dual Cycle Internal Combustion Engine Process and Apparatus"; Ser. No. 494,653, filed Oct. 11, 1965, now abandoned, entitled "Supply and Separation Method and Means for Fuel-Air Mixtures for Internal Combustion Engines"; and Ser. No. 553,425, filed May 27, 1966, now abandoned, entitled "Internal Combustion Engine and Process Utilizing Excess Air," and others referred to therein.

This invention relates to an internal combustion engine and process of the class in which heated auxiliary air is added to the combustion during the time of substantially maximum temperature and pressures in the engine cycle in order to obtain a complete and clean combustion. More specifically, it relates to a spark-ignition engine of the fuel injection class which operates with fuel which is heated while in the liquid state in the presence of air prior to initiation of combustion, and which is subsequently burned in a flame induced progressive, surface combustion reaction in conjunction with heated auxiliary air in which the combustion takes place in a localized manner and progresses from an initial reaction with an excess of fuel to a final reaction with an excess of air. Power of the engine is controlled by a combination of both variable fuel supply and air density.

It is a general object of the invention to provide a method of combustion in which auxiliary air may be utilized to complete the combustion and improve the thermal efficiency of the engine. A further object is to provide a method of combustion which has a positive control over both pre-ignition and detonation and can utilize fuels having a wide range in both octane number and specific gravity. An additional object is to provide an engine which can operate with white gasoline and no anti-knock additives at high compression ratios. Another object is to provide an engine which can accelerate, or decelerate, without emitting exhaust fumes, and which has an extremely low emission of CO and $NO_2$. It is also an object of the invention to provide the means which make it possible to achieve the stated results, such as means for supplying unatomized liquid fuel to the engine in variable quantity at variable time, means for providing an ignition flame to carry out the surface combustion process, means for controlling the auxiliary air supplied to the engine and means for coordinating the time of fuel injection with engine temperature, speed, and load.

Additional objects and features of the broad invention as well as special objects and features will be described in the specification in conjunction with the description of various specific illustrative embodiments of the broad invention.

In the design of internal combustion engines, many attempts have been made to secure clean combustion by simply adding an excess of air to the cylinder. This has been especially true for those engines which inject the fuel into the combustion chamber. Good combustion is not so easily obtainable. Air, which is composed of substantially ⅘ inert nitrogen, acts as an impediment to combustion, similar to exhaust gases, unless the air is very hot. In spark ignition engines, a fast combustion is not obtained except with a stoichiometric or slightly richer fuel-air mixture, and an excess of either fuel or air reduces the combustion rate. The heat of compression alone is not enough in a spark ignition engine to heat the air adequately, and satisfactory results can be obtained only if the auxiliary air is additionally heated by an initial combustion before the air is added to the reaction.

One way in which proper heating and utilization of the air may be achieved is by using the surface combustion process, which was first described in our Patents Nos. 2,808,036 and 2,808,037. Here, the sequence of events is different than in the combustion of a pre-mixed fuel-air charge such as is provided by a carburetor. In the surface combustion process, the fuel, while in a liquid, unatomized state is injected into the combustion chamber well in advance of the initiation of combustion and is held on a wall thereof in a position exposed to air. Important preflame reactions take place at this time in the fuel. Then an ignition flame, produced by the combustion of a small pre-mixed fuel-air charge, is directed against the heated, liquid fuel body while exposed to air. The flame heats and progressively vaporizes the fuel in incremental portions, while also heating the surrounding air, and drives the fuel vapors produced into the air while simultaneously igniting the mixture as it is formed. As the vapors enter the air, the resulting fuel-air ratio locally formed progresses from a rich mixture, to a lean one, as the fuel is displaced into the surrounding air. The combustion of the fuel, which proceeds as the dispersion takes place, progresses rapidly from one having an excess of fuel, to one having an excess of air. The air, which is highly heated in the vicinity of the flame, acts to produce a clean and complete combustion. The combustion is progressive, both in the transition from rich to lean, and in the combustion of the fuel charge as a whole. The ignition flame progressively vaporizes the liquid fuel body as it displaces the fuel vapors formed out into the surrounding air. The temperature of the momentarily unburned liquid fuel is held uniform by the combustion chamber wall on which it is held, and none of the fuel, even the last to be burned, is ever heated sufficiently to promote a detonating combustion. No fuel-air mixture is formed in advance of its ignition, and even low octane fuels can be burned at high compression ratios without detonation.

The surface combustion reaction is a localized burning, and can take place in the presence of substantial quantities of excess air without being quenched by it. Consequently, sufficient excess air can be held in the combustion chamber to effectively reduce and control the peak temperatures sufficiently to reduce the formation of $NO_2$ to very low levels, and at the same time produce extremely low concentrations of CO.

The tendency for low octane fuels to pre-ignite at high compression ratios is controlled by varying the time of fuel injection prior to ignition. The pre-flame reaction which takes place in fuel exposed to heat and air prior to combustion may lead to pre-ignition or detonation if sufficient time is provided. When cold, the maximum time of exposure is desirable to avoid incomplete combustion, and the fuel is injected at the beginning of the intake cycle, but when hot, injection is retarded to near the end of compression cycle. The ignition flame, which induces the surface combustion reaction, is produced in an ignition chamber which is a part of the total combustion chamber. It is usually made in the shape of a toroidal cavity, although other forms are useful. Air is usually supplied directly to the ignition chamber through a separate intake valve in the ignition chamber. When this is done, a fuel-air charge suitable to be spark-ignited may be supplied to the ignition chamber in two distinct ways. When the engine is cold, a fuel-air mixture of substantially stoichiometric proportions is supplied by a manifold to said chamber. The mixture may be produced by a carburetor or by injection into the manifold, but is conventional. When the engine becomes hot, and pre-ignition may occur, the fuel is supplied directly to the ignition chamber by injection into the chamber while all fuel to the manifold is cut off. The time of fuel injection may therefore be retarded, as in the cylinder, to occur late in the compression stroke if desired. The fuel is preferably deposited on a wall of the ignition chamber and is vaporized by means of air circulating therein to form the spark ignitable charge directly in the ignition chamber. The transition from manifold formed fuel charge to direct injection may be made gradually, with some fuel supplied from both sources as the engine temperature varies. Additionally, if desired, the fuel supplied to the manifold may be more volatile than that supplied to the injectors, to permit the use of heavy, inexpensive fuel for industrial engines.

In the accompanying drawings, showing somewhat diagrammatically typical embodiments of the broad invention:

FIGURE 1 is a vertical cross-section of a preferred form of spark ignition, fuel injection engine having a hemispherical combustion chamber with inclined valves, a toroidal ignition chamber and fuel supply and control means shown partially in diagrammatic form and as a single cylinder of a multiple cylinder engine, taken along the line 1—1 of FIGURE 2;

FIGURE 2 is a diagrammatic plan view of the engine shown in FIGURE 1;

FIGURE 3 is an enlarged section of a hydraulic injection control valve, taken along the line 3—3 of FIGURE 4;

FIGURE 4 is an enlarged section of the hydraulic valve shown in FIGURE 3, taken along the line 4—4 of FIGURE 3;

FIGURE 5 is a diagrammatic vertical section of the engine shown in FIGURE 1, showing the flow of working fluid into and out of the ignition chamber;

FIGURE 6 is a vertical cross-section of an alternate form of the invention having a simplified form of fuel supply system using a single injector and modified control means, taken along the line 6—6 of FIGURE 7; and FIGURE 7 is a diagrammatic plan view of the engine shown in FIGURE 6.

The engine shown in FIGURES 1 and 2 is basically a substantially conventional four-cycle engine having a hemispherical combustion chamber with inclined intake and exhaust valves. It is shown with water cooling, but any conventional liquid or air cooling means may be used, and is shown as a single cylinder engine, but the principles disclosed may be applied equally well to multiple cylinder types.

A cylinder block 10 having a cylinder bore 11 with a piston 12 therein, has a cylinder head 13 fastened onto the upper end thereof. Both cylinder block and cylinder head are cooled by means of water jacket 14. A combustion chamber 15 of substantially hemispherical design is formed in head 13, which also includes valve seats for a conventional intake valve 16 and exhaust valve 17. Both valves are operated in the usual manner by conventional means (not shown). Intake manifold 18 leads to the seat controlled by valve 16, and exhaust manifold 19 leads from the seat controlled by valve 17.

A toroidal ignition chamber 20 which has substantially the form of a spheroid with its minor axis of revolution coaxial with the central axis of said cylinder 11 is located above chamber 15 and is joined thereto by a short passage 21 which extends partially up into the chamber. A spark plug 22 is screwed into the head 13 in a position with its electrodes 23 extending out into the central portion of the ignition chamber and approximately on the horizontal, circular axis 24 of the toroidal cavity therein.

An auxiliary intake valve 25 and valve seat 26 therefore are located in the top of ignition chamber 20 substantially coaxial with the passage 21. An auxiliary intake manifold 27 leads tangentially to valve seat 26 and communicates tangentially with ignition chamber 20 when valve 25 is open.

A carburetor 28 of special design, whose function will be described later, is joined to manifold 27. It is only part of the fuel system for the engine, which is primarily a fuel injection system, to be described. The fuel system includes a fuel tank 29 which supplies fuel to carburetor 28 through fuel line 30 in a conventional manner, and to a fuel pump 31 which in turn supplies the fuel, under pressure, to fuel line 32. Line 32 is branched and is connected to the fuel injectors 33 and 34 (two for each cylinder in a multiple cylinder engine) by means of branch lines 35 and 36. Injectors 33 and 34 are identical in design and are of the non-atomizing liquid fuel injection type. Injector 33 has a body 37 which extends into one edge of the toroidal ignition chamber 20 at 38 as shown and has a conical valve seat 39 whose axis extended intercepts the inner wall of the ignition chamber at a point 40. A conical valve 41 having a long stem 42 fits tightly in conical seat 39. A fuel passage 43 parallel to stem 42 extends from the valve seat 39 to a fuel chamber 44, with which the branch fuel line 35 communicates. Injector 34 has the same parts as injector 33 and they are identified by the same numerals with subscript $a$ added. The valve seat 39a opens into combustion chamber 15 at a point 45 and fuel chamber 44a communicates with branch fuel line 36.

The injectors as shown are operated hydraulically, although it will be evident that other means, such as mechanical or electrical could be used. A pump 50 delivers hydraulic fluid under pressure to all the injectors through a tube 51 and branch tubes 52 and 53 (two per cylinder in a multiple cylinder engine).

Branch tube 52 communicates with a fluid chamber 54 in injector 33 through an orifice 55 which restricts the flow of fluid into the chamber from said pump. An individual tube 56 connects the chamber 54 with a control valve 57 shown in detail in FIGURE 3. This figure shows a valve for a multiple cylinder engine in which an individual tube 56 from each ignition chamber injector goes to a common control valve having as many inlet connections 58 as there are injectors. These are equally spaced about the axis 59 of said valve and open into a common central cavity 60. A single tube 61 connects said cavity to pump 50, which completes the fluid circuit. A single cylinder engine has only one inlet connection.

A second control valve 62, identical in design to valve 57, is connected to the individual fluid tube 63 from cylinder injector 34 and has a branch tube 64 opening into return tube 61 to said pump.

Both control valves, as shown in FIGURE 3 for a multiple cylinder engine, have a central shaft 65 coaxial with the axis 59 of the cavity 60. A close fitting valve member 66 shown in FIGURE 4, mounted on shaft 65, is turned around inside cavity 60 and sweeps over the open ends 67 of inlet connections 58 in succession as shaft 65 is rotated. This momentarily closes the ends of said connections and prevents the flow of hydraulic fluid therein.

The valve is controllable in two distinct ways. It can vary both the time and the duration of the tube closing. As shown, the shaft is driven by suitable means, such as sprocket 46 and chain 47, at the cam shaft speed of the engine, in the direction of arrow 68. The outer housing 69 is mounted so as to be rotatable about said shaft 65 by arm 70 and rod 71 (inlet connections 58 are flexible at the valve) and also movable laterally, parallel to said shaft as shown by arrow 72 in FIGURE 4. Valve member 65 has a triangular shape as shown in FIGURE 4. When the end of connection 58 is in the position shown by the circle 73, the valve member 66, moving in the direction 68, never closes it. But as the housing 69 is moved in the direction of arrow 74, the opening 73 is first intercepted by the narrow end 75 of valve 66, and finally, as shown by the dotted circle 67, it is intercepted by the widest end 76 thereof. This changes the duration of tube closing from zero to maximum. The rotation of valve housing 69 in the same direction as arrow 68 retards the time of tube closing relative to the engine crankshaft and moving in the opposite direction advances it in a manner analogous to retarding and advancing the ignition spark in a distributor.

The closing of the end 67 of inlet connection 58 causes the fuel injector 33 to open by increasing the pressure in the tube 56 and the injector fluid chamber 54. The upper wall of said chamber is a large diaphram 77 which is attached at its center to valve stem 42. A spring 78 acts against the end of the stem to hold the valve 41 against its seat 39. A second diaphragm 79 having a substantially smaller area than diaphragm 77 acts to seal fluid chamber 54 from the fuel chamber 44 and permits the valve to open and close.

In operation, the hydraulic pump continuously circulates fluid through the system, but there is a pressure drop across the orifices 55 (one in each injector), so that the pressure in tube 51 is higher than in fluid chamber 54 and the return line 61 to the pump. When the valve member 66 closes the end 67 of inlet connection 58, connected to tube 56, the flow is stopped in this tube and the pressure quickly builds up through the orifice 55 to the pump pressure in tube 51. This increase in pressure in fluid chamber 54 forces diaphragm 77 up against spring 78 and opens the valve 41, which then admits fuel into the ignition chamber for as long as control valve member 66 keeps tube inlet 67 closed. When the tube inlet 67 is opened, the pressure quickly falls in fluid chamber 54 and spring 78 closes valve 41, thereby stopping the flow of fuel.

This fuel supply system is similar to the "common rail" fuel supply used on some diesel engines, but operates with much lower fuel pressures. The object in this engine is not to atomize the injected fuel, but to admit it in the form of a liquid slug. The fuel in the injector converges around valve 41 when it is open and flows from the conical valve seat 39 in a single liquid stream as shown by line 80 in the ignition chamber 20. The fuel flow from injector 34 is shown by line 81 in the combustion chamber.

The engine operates in several different ways depending on engine temperature and load. When operating cold, or partially warm and at about ¼ load or less, the fuel is supplied to said engine entirely by carburetor 28. At this time said carburetor supplies a conventional, substantially stoichiometric fuel-air mixture to manifold 27, with the quantity controlled by throttle 82. Intake valve 16 and auxiliary intake valve 25 open together in the conventional manner during the intake cycle of the engine, and a fuel-air mixture is drawn into the ignition chamber 20 as shown by arrow 83. The tangentially positioned manifold 27, as shown in FIGURE 2, directs the fuel mixture into the toroidal ignition chamber so as to circulate in a horizontal plane about the periphery of said chamber. In order to enter the cylinder through passage 21, the mixture spirals in toward said passage, then down and outwardly as shown by arrow 84. At the same time a limited quantity of air is admitted past control throttle 85 through main intake valve 16 to enter cylinder 11 tangentially at a level below flow 84 as directed by the tangentially oriented manifold 18. This is shown by flow line arrow 86. The circulation is in the same hand as the circulation of the mixture from the ignition chamber. This assists in keeping the fuel mixture and the cylinder gases separate because they circulate about a common axis in axially parallel but adjacent flow paths. Throttle valve 85 preferably has its actuating shaft vertical as shown in FIGURE 2 to help direct the entering air tangentially into the chamber when the valve is partially closed, but is shown with a horizontal actuating shaft in FIGURE 1, for the sake of clarity in illustrating the power control system.

During the compression stroke the piston 12 compresses the gases in the cylinder 11 into the combustion chamber 15 and ignition chamber 20. The line of flow into the ignition chamber is indicated in FIGURE 5 by arrows 87. That portion of the fuel charge which has expanded out into the combustion chamber during the intake cycle is the first to be recompressed back into the ignition chamber, and circulates about the axis 24 of the toroidal cavity in a converging spiral, as shown. It joins with the mixture which remained in the ignition chamber. Then a portion of the air which was admitted and some of the residual exhaust gases in the cylinder enter and circulate around the outside of the fuel mixture, forcing the mixture toward the axis 24 to form a body whose size is generally indicated by the circle 48. At the end of the compression stroke, practically no fuel remains in the combustion chamber 15, but it is concentrated along the axis 24 substantially uncontaminated by excess air or exhaust gas, with some air and exhaust gas surrounding it. The spark plug electrodes 23 are located on the axis 24, and the ignition spark ignites the small but uncontaminated and therefore fast-burning fuel-air mixture. The initial combustion heats the excess air, which then mixes with the burning gases as they expand through passage 21 into combustion chamber 15 and this completes the reaction.

The quantity of excess air admitted is matched to the quantity of fuel-air mixture admitted by means of the power control mechanism. This consists of a control lever 88, pivoted at 89, and pivotally joined at 90 to substantially the center of a bar 91. This bar has a rod 92 at one end which actuates throttle 85, and a rod 93 at the other end which actuates throttle 82 in carburetor 28. The bar also has an extension 95 which engages control lever 88 as shown when forced in contact by spring 96 acting through rod 92. In this position, the center pivot 90 does not pivot; but as control lever 88 is moved upwardly at its right end to increase the engine power, rod 92 moves down slightly (pivot point 97 of rod 92 is close to pivot 89) while rod 93 moves more (pivot point 98 of rod 93 is far from pivot 89) to open throttle 82 quickly. By adjusting the relative motion of these two throttles, the quantity of auxiliary air admitted to the cylinder 11 can be matched to the quantity of fuel mixture admitted to provide the proper excess to obtain clean combustion.

When throttle 82 is fully open, the engine develops about ¼ of its maximum power. Beyond that, additional power is obtained by injecting fuel through injector 34 into the cylinder. When the engine is cold or partially warm, injection occurs early in the intake stroke and is initiated by moving lever 88 beyond the point where throttle 82 is fully open. In the fully open position rod 93 rests on stop 99 and further movement of lever 88 causes bar 91 to pivot at 98 and open throttle 85 move fully against spring 96. Rod 100 is connected to throttle 85 and to control valve 62 and is adjusted so as to start closing fluid tube 63, which controls injector 34, as soon as throttle 82 is fully open.

The quantity of air admitted to the cylinder by throttle 85 is matched to the qauntity of fuel injected so that there is some excess of air in the cylinder relative to the fuel when a fuel-air mixture is formed. The fuel is injected in an unatomized liquid stream 81 and impinges on the piston near the center 101 thereof. The liquid fuel is held as a thin liquid film on the piston top during the intake and compression cycle, during which time the fuel absorbs heat from the piston and from the gases in the cylinder. A small amount of the fuel may vaporize during this time, but pre-vaporization is minimized as much as possible by placing the fuel in the central quiet region of the piston while the gases in the cylinder circulate around the periphery thereof. The fuel is heated in the presence of the air in the cylinder and important pre-flame reactions take place at this time which promote its ultimate combustion. It is important to have the air circulate around the central axis of the cylinder in order to produce a quiet zone in the center of the piston on which to deposit the fuel and prevent pre-vaporization thereof. It is also useful that this circulation serves to produce a quiet zone extending axially above the piston through which the fuel may be injected at any time between the early intake and later compression stroke without entraining the fuel in the air stream.

The fuel charge in the ignition chamber is prepared as already described while the fuel charge in the cylinder is deposited on the piston. Substantially none of this fuel from the piston ever reaches the ignition chamber, as the two fuel charges are separated and independent of each other at all times. When the ignition charge is ignited, the flame therefrom passes down through passage 21 and impinges directly on the fuel body on the central portion 101 of the piston in a flow shown by arrows 102 in FIGURE 5. This flame, which carries some excess air, induces a surface combustion reaction, in which the flame first heats the fuel and vaporizes it progressively from its surface, then displaces the vapors out into the surrounding air to form a fuel-air mixture and simultaneously ignite it. The surrounding air is also heated by the flame so that conditions for combustion are ideal. The heated fuel vapor and heated air are first formed into a mixture with an excess of fuel, which ignites quickly and burns rapidly. Then the mixture becomes progressively leaner as it is mixed further with the heated excess air surrounding it. The process is continuous and progressive until the fuel is all vaporized. The fuel-air mixtures formed are ignited as they are produced, and the momentarily unvaporized fuel held on the piston has its temperature limited to that of the piston. Hence, while the fuel remains liquid, it cannot be overheated, and detonation inducing reactions cannot be initiated. The last fuel to burn passes through substantially the same temperature cycle as the first fuel to burn. The combustion is therefore smooth, fast, and non-detonating, and fuels of low octane value can be burned at high compression pressures.

The length of time the fuel should be exposed to heat and air prior to the initiation of combustion depends on the engine temperature, engine speed, fuel density, and octane numbers. Any combination of these variables which lead to too much pre-heat and time for pre-flame reactions to occur in the fuel can lead to pre-ignition and consequently the time of fuel induction into the engine needs to be correlated by these variables. When the engine is cold, or moderately warm, the fuel mixture for the ignition chamber is provided by the carburetor, and the maximum time and heat available is utilized to prepare the fuel mixture. Conventional intake manifold heating means (not shown) such as exhaust heat may be applied to manifold 27 to heat the fuel, while additional fuel for the cylinder is injected early in the intake cycle as described. As the engine temperature rises, a gradual change takes place toward later and later induction of the fuel. Since the time of induction of fuel from the carburetor is limited to the intake cycle, the injector 33 is provided which can gradually supersede the carburetor and ultimately replace it and permit induction of the fuel for the ignition chamber late in the compression cycle just before ignition.

A heat responsive unit 103, sensitive to engine temperature, is provided which operates a lever 104 pivoted at 105. This lever operates a metering pin 106 in carburetor 28, and controls the fuel-air ratio of the mixture delivered by the carburetor. When the engine is cold, the mixture is substantially stoichiometric, but as the engine gets hotter, heat responsive unit 103 moves lever 104 upwardly, which moves metering pin 106 downwardly to restrict the flow of fuel and the fuel-air mixture becomes progressively leaner until ultimate complete fuel cut-off. The lever 104 also controls the quantity of fuel delivered to the ignition chamber by injector 33. The output control rod 107 of valve 57 is connected to an extension of rod 93 by a lever 108 which is connected by pivots 109 and 110 at each end to these rods. A third slidable pivot 111 between these other two points is supported by lever 112 fastened to lever 104. This slidable pivot is the fulcrum about which lever 108 acts. When the heat unit is cold, lever 104 is down and slidable pivot 111 moves adjacent pivot 109. Movement of pivot 110 by rod 93 operating throttle 82 does not appreciably move control rod 107 which in this position has fuel to injector 33 cut off. When heat unit 103 is hot, lever 104 moves up and slidable pivot 111 moves to the left, causing pivot 109 (and rod 107) to move when rod 93 moves. Opening the throttle causes the control valve 57 to operate injector 33 and deliver fuel to the ignition chamber. The amount of fuel delivered is correlated with metering pin 106 to make the total quantity of fuel delivered to the ignition chamber equal for any given opening of throttle 82 whether the engine is hot or cold. In this way, the fuel-air ratio of the fuel mixture in the ignition chamber remains uniform at all loads and temperatures. One source of fuel is turned on as the other is turned off.

The injected fuel is not atomized, but is delivered in a liquid stream 80 to the wall of the ignition chamber at point 40. The fuel is vaporized by the air which circulates in a stream 83 in the ignition chamber and sweeps over the fuel body. Heat from the ignition chamber wall also helps to vaporize the fuel. When the engine is quite hot and injection takes place during the compression stroke, the fuel is vaporized by the stream 87, and the residue of the circulation 83 which combines therewith to form a spiral flow around the toroidal cavity.

The tendency for a vaporized fuel and air body to detonate is much less than that of an atomized fuel and air body in which liquid fuel droplets are caught in the high temperature of the ignited ignition charge. The ignition charge also burns first, before the temperatures and pressures in the combustion chamber reach their maximum values. Consequently, low octane fuel can be used in a pre-mixed fuel-air mixture in the ignition chamber under conditions impossible in the main combustion chamber. There the surface combustion process must be used.

The time of fuel injection is also controlled by the heat sensitive unit 103. The injection timing control rod 71 linked to both control valves 57 and 62 is connected by means of bell crank 113 and rod 114 to lever 104. The injection time varies from early intake when the engine is cold to late compression when hot. A governor 115, or any equivalent speed responsive element, is linked to the lever 104 by a rod 116 which can over-ride the heat sensitive unit 103 and retard the fuel injection at low engine speed even when the engine is only moderately hot. The time for heat absorption by the fuel must be limited and since this becomes longer as engine speed is reduced, the governor control, in combination with the temperature control, is desirable. It is also advantageous to correlate the injection timing with the engine load, which can fluctuate much more rapidly than the basic engine temperature. As the load is increased, the time of injection is retarded, to match the rise in internal combustion chamber temperatures due to the increased load. This control may be a vacuum operated diaphragm unit 117 which has a diaphragm 118 responsive to the vacuum in manifold 18. Vacuum line 119 connects the unit to the manifold at a point 120 between the throttle 85 and the valve 16. A rod 121 connects the diaphragm to the injector timing control rod 71 which acts then in response to engine temperature, speed, and load.

The pressure of the fuel delivered by fuel pump 31 is varied by heat sensitive unit 103 and the power control lever 88 in order to match the fuel pressure to the pressure in the cylinder at the time of injection. At the time of early injection during the intake stroke, the cylinder pressure is below atmospheric, while with late injection during the compression stroke, the pressure rises to the neighborhood of 200 pounds per square inch, the value depending on the degree of throttle opening. The fuel pressure in fuel line 32 is consequently varied by means of springs 122 and 123 acting jointly on the piston 124 which controls relief valve 125 of pump 31. The fuel pressure in the fuel line 32 is adjusted to be at a pressure about 25 to 100 p.s.i. above the cylinder pressure in order that the rate of fuel flow be uniform at all times and that it be low enough to prevent atomization in the cylinder. The spring pressure on the fuel relief valve is varied by the joint action of lever 126, actuated by heat sensitive unit 103, and rod 127 and lever 128 actuated by the power control lever 88. The maximum spring pressure is exerted on the relief valve when the throttle 85 is open and injection occurs late in the compression cycle (hot and full load) and the minimum pressure is applied when the throttle is substantially closed and injection occurs early in the intake cycle (cold and light load).

It is desirable to operate the engine with fuel which contains no anti-detonation additives, as this reduces air pollution and also keeps the engine cleaner inside and the valves fitting better. With a clean engine, the internal cooling is better and the valves remain cooler, all of which retard the tendency of the fuel to pre-ignite and detonate. Furthermore, because of the excellent fuel charge localization obtained in the ignition chamber with the toroidal circulation pattern therein, and the localization of the fuel charge inherent in the surface combustion process, the engine can operate with sufficient excess air to lower the peak combustion temperatures and minimize the formation of nitrous oxide without impeding or quenching the combustion.

For some types of operation, as in tractors or industrial power, it may be desirable to operate with the lowest possible gravity fuel below gasoline. If a separate fuel tank is provided for the carburetor 28 and the fuel pump 31, it is possible to restrict the consumption of gasoline to cold starting.

The engine shown in FIGURES 6 and 7 is also of the fuel injection type, but differs from the first design principally in that it has only a single fuel injector per cylinder which performs the function initially carried out by two injectors. The fuel supply system is accordingly modified, in particular the control means, and the means for dividing the injected fuel into two distinct bodies inside the combustion chamber.

A cylinder block 130 having a cylinder bore 131 with a piston 132 therein, has a cylinder head 133 fastened onto the upper end thereof. Both cylinder block and cylinder head are cooled by means of water jackets 134. A combustion chamber 135 of substantially hemispherical design is formed in head 133, which also includes valve seats for a conventional intake valve 136 and exhaust valve 137. Both valves are operated in the usual manner by conventional means (not shown). Intake manifold 138 leads to the seat controlled by valve 136, and exhaust manifold 139 leads from the seat controlled by valve 137.

A toroidal ignition chamber 140 which has substantially the form of a spheroid with its minor axis of revolution coaxial with the central axis of cylinder 13 is located above chamber 135 and is joined thereto by a short passage 141 which extends somewhat upwardly into said chamber. A spark plug 142 is screwed into the head 133 in a position with its electrodes 143 extending out into the central portion of the ignition chamber and approximately on the horizontal, circular axis 144 of the toroidal cavity therein.

An auxiliary intake valve 145 and seat 146 therefor are located in the top of the ignition chamber, offset from the central axis of revolution and near the edge thereof. An auxiliary intake manifold 147 leads to valve seat 146 and communicates tangentially with said ignition chamber when valve 145 is open.

A carburetor 148 of special design, whose function will be described later, is joined to manifold 147. It is only part of the fuel system for the engine. The fuel system includes a fuel tank 149 which supplies fuel to carburetor 148 through fuel line 150 in a conventional manner, and to a fuel pump 151 which in turn supplies the fuel, under pressure, to fuel line 152. This line 152 is connected to fuel injector 153 which is identical in design and operation to injector 33 already described. Said injector is mounted on the ignition chamber 140 and is oriented to deliver a stream of liquid fuel 154 to a side wall 155 of connecting passage 141 at an oblique angle of impingement as shown. When injected as a liquid nonatomized stream with moderate velocity, some of the fuel will wet the wall 155 and remain there, while the remainder will continue on in a stream 156 and impinge on the central area 157 of piston 132. The injector is operated hydraulically in the manner already described, by means of a pump 158, control valve 159, and fluid tubes 160, 161, and 162.

The engine operates in several different ways, depending on engine temperature and load. When operating cold, or partially warm and at about ¼ load or less for starting, the fuel is supplied to said engine entirely by carburetor 148. At this time, said carburetor supplies a conventional, substantially stoichiometric fuel-air mixture to manifold 147, with the quantity controlled by throttle 163. The mixture flows into the engine as shown by arrows 83 and 84 in FIGURE 1. At the same time, a limited quantity of air is admitted past control throttle 164 and through main intake valve 136 to enter cylinder 131 tangentially as directed by the tangentially oriented manifold 138. It circulates in the same direction as the entering fuel mixture in the ignition chamber.

During the compression and power cycle, the operation is the same as already described and shown in FIGURES 1 and 2, for cold operation. The power control method and means is, however, somewhat different. A control lever 165 pivoted at 166, and pivotally joined at 167 to substantially the center of a bar 168, operates throttle 163 by means of rod 169 and throttle 164 by means of rod 170. As already described, a spring 171 acting on rod 170 holds bar 168 against lever 165 at 172, and provides a mechanism by which the initial motion of lever 165 opens throttle 163 fully, and throttle 164 slightly, and additional motion holds throttle 163 fully open and opens throttle 164 additionally.

The injection control valve 159 has a control rod 173 and a spring 174 which holds the valve in the off position so no fuel is injected. When throttle 164 opens, after throttle 163 is fully open, the rod 175 (connected to lever 165) engages rod 173 and pushes it up against spring 174 to initiate the injection of fuel. The quantity of fuel injected is directly proportional to the opening of throttle 164. At the same time, rod 176 engages a metering pin 177 in carburetor 148 which quickly cuts off all fuel to the carburetor jets. The extension spring 178 in rod 176 allows the initial motion to close the metering pin 177 quickly and absorb further motion of the rod.

The control mechanism functions in the manner described when the engine is cold or moderately warm. The engine's initial operation is entirely on fuel supplied by the carburetor 148. When fuel begins to be injected at above about ¼ load, the fuel impinges first on the side wall 155 of passage 141. Small quantities simply wet the wall, and the flow of gases through the passage and over said wall during the intake and compression cycles of said engine act to vaporize this fuel. Most of this fuel is ultimately compressed into the ignition chamber 140, together with some auxiliary air from the cylinder admitted through valve 136. The additional fuel supplied to the ignition chamber by injection is matched by the fuel cut off at the carburetor by metering pin 177 in order to keep the fuel-air ratio substantially constant.

The quantity of fuel delivered to the ignition chamber by injection alone is determined by the quantity of fuel held on the side wall 155 immediately after injection. When very small quantities of fuel are injected, the fuel wets the wall and remains there until vaporized, but when large quantities are injected, the major portion continues on in stream 156 and is deposited on the piston 132. The quantity held on wall 155 is substantially proportional to the area of the wall that is wetted with fuel, and tends to remain constant even when large quantities of fuel are injected up to full load operation. Because of this, the fuel for the ignition chamber can be obtained from the variable quantities of fuel injected by the single injector 153 from light to full load, and still remain substantially constant in quantity.

The operation of the engine when hot is modified in a manner similar to that in the first embodiment. All fuel to the carburetor is cut off and the time of fuel injection is retarded to the compression cycle. This is accomplished by means of a heat sensitive unit 179 which acts on lever 180 pivoted at 181. An arm 182 acts on fuel metering pin 177 to cut off fuel to the carburetor simultaneously with moving slidable pivot 183 on arm 184 far from the end of lever 185 adjacent the control rod 173. Lever 185 is adapted to engage rod 173 at 186, while the end 187 is pivotally attached to rod 169 extended. In the hot position, lever 180 is raised at the heat sensitive unit end, which acts to depress the metering pin to fuel cut off, and pivot lever 185 near its center, with the slidable pivot 183. Then, lever 165 acts to simultaneously open the injector control valve 159 to start injection together with the opening of throttle 163. This action is coordinated to produce a substantially stoichiometric fuel-air mixture in the ignition chamber. The rods 188 and 189 act on control valve 159 to retard the time of fuel injection as already described.

It will be evident that the basic surface combustion process is carried out in the same manner as in the preferred embodiment. The toroidal circulation established in the combustion chamber 135 by the ignition flame from the ignition chamber 140 as shown in FIGURE 5 by flow line 102, may be enhanced if the piston 132 is beveled around its periphery 190 as shown. The peripheral displacement 191 caused at the end of the compression stroke acts to assist the flame induced circulation and promotes a faster burning. The additional speed and load controls shown in FIGURES 1 and 2 may equally well be applied to this engine as well as the fuel pressure control means shown.

It will be evident that many more combinations of the elements shown can be made than are illustrated. For example, the injector 153 may be oriented axially with respect to the cylinder 131 and deliver fuel centrally through passage 141 directly to the center 157 of piston 132 without wetting the walls of said passage. It then replaces the function of injector 34 as shown in FIGURE 1 and when combined with a second injector 33 as shown in FIGURE 1 makes possible a more symmetrical arrangement of the dual injector design.

It is understood that the engines described are not limited to the precise structure shown and described, but also include such modifications as may be embraced within the scope of the appended claims.

We claim:
1. In the operation of an internal combustion engine of the spark ignition, surface combustion type, in which an ignitable fuel-air mixture, formed prior to ignition, is ignited by spark ignition means and the resulting flame is directed forcefully as a jet of flaming gases from a partially confined ignition chamber against a substantially liquid body of fuel which has been deposited on a wall of the combustion space of said engine substantially in advance of the time of ignition and in the presence of the working fluid in said engine which is composed of air and residual exhaust gases and is independent of said ignitable fuel-air mixture, the method of operating said engine and supplying fuel thereto to minimize pre-ignition and detonating combustion, which includes as steps: establishing and maintaining, during the intake and compression cycles of said engine, a circulation of said working fluid about an axis in said combustion space which terminate at a point on the wall of said combustion space, and producing thereby a zone of limited area on said wall around said point of termination of said axis over which said working fluid flows with lower velocity than over other parts of the boundary of said combustion space; introducing liquid fuel into said combustion space at some time between the beginning of the intake cycle and the end of the compression cycle in a substantially unatomized and unvaporized stream substantially along said axis of circulation to minimize dispersion of said fuel by said circulating working fluid during said introduction; intercepting said liquid fuel on said wall within said zone; holding substantially all of said fuel on said wall within said zone, from the time of introduction until the time of combustion, where it is not appreciably vaporized prior to combustion by said lower velocity working fluid passing over said fuel and where said liquid fuel is exposed to the air in said working fluid and to residual heat, from prior combustion, in the walls within said zone to promote pre-combustion reactions in the fuel; igniting said partially confined fuel-air mixture to produce a high velocity jet of flaming gases; directing said jet of flaming gases to impinge forcefully upon said liquid fuel body deposited on the walls within said zone to progressively vaporize said fuel from the fuel surface exposed to said jet of flaming gases; progressively displacing said fuel vapors from said zone by said jet of flaming gases, as they are formed, and mixing said vapors with the air in said working fluid; and progressively igniting said fuel vapor and air mixture, as it is formed, by said jet of flaming gases.

2. A method as in claim 1 which includes as steps: varying the temperature of the wall of said combustion space on which said liquid fuel is held from the time of introduction into said combustion space until vaporization is induced by said ignition flame during combustion; and varying the time of said fuel introduction from early in the intake cycle when said wall temperature is low to late in the compression cycle when said wall temperature is high, to maintain the transfer of a substantially uniform amount of heat from said wall into said fuel under all engine operating conditions to promote substantially uniform pre-combustion reactions in said fuel.

3. A method of operation as in claim 2 which includes as steps: varying the temperature of the walls of said partially confined ignition chamber; introducing an externally mixed fuel and air mixture to said chamber when said ignition chamber wall temperatures are relatively low; introducing air and liquid fuel separately into said ignition chamber when said chamber wall temperatures are relatively high; and introducing said liquid fuel onto said chamber walls for vaporization therefrom prior to ignition at a time near the end of the compression cycle when said chamber wall temperatures are relatively high, and progressively earlier in the engine cycle when said wall temperatures are relatively lower.

4. A method of operation as in claim 2 which includes as steps: introducing liquid fuel into said combustion space in liquid form in a fluid stream at low pressure to minimize atomization of said fuel; and varying the pressure at which the fuel enters said combustion space relative to said variation in the time of fuel introduction in said engine cycle, with said fuel pressure mantained at a substantially uniform increment of pressure in excess of the pressure in said combustion space at the time of introduction.

5. In the operation of an internal combustion engine of the spark ignition, surface combustion type in which an ignitable fuel-air mixture, formed prior to ignition, is ignited by spark ignition means and the resulting flame is directed forcefully from a partially confined ignition chamber against a substantially liquid body of fuel which has been deposited on a wall of the combustion space of said engine substantially in advance of the time of ignition and in the presence of air and residual exhaust gases, and is independent of said ignitable fuel-air mixture, the method of controlling the power of said engine by varying both the quantity of fuel and the density of the air delivered to said engine, which includes as steps: supplying a limited and variable quantity of ignitable fuel-air mixture at variable low density to said ignition chamber; igniting said mixture and utilizing the force from the combustion of this mixture alone to vary the power of said engine from idle to approximately one-fifth of full load; depositing a variable quantity of substantially unatomized and unvaporized liquid fuel in a body on a wall of the combustion space of said engine for additional power, up to full load; supplying a variable quantity of air at variable density to said combustion space to provide sufficient air to produce a substantially stoichiometric combustion with the liquid fuel supplied, plus a small excess of air; supplying a quantity of fuel-air mixture to said ignition chamber to substantially fill said chamber at the density at which said air is supplied to said combustion space; igniting said fuel-air mixture to produce a forceful ignition flame; directing said flame directly against said liquid fuel deposited on said wall of said combustion space; progressively vaporizing and mixing said fuel with the air in said combustion space by means of said flame; and progressively igniting said vaporized fuel and air mixture, as it is formed, by said flame.

6. In an internal combustion engine of the spark ignition type having a cylinder and piston, the combination of: wall means, including said cylinder and the top of said piston, forming a combustion space; wall means for directing working fluid, comprised substantially of air, into said cylinder during the intake cycle to circulate about the central length axis of said cylinder with substantially constant angular velocity and minimum linear velocity adjacent said axis; means for supplying a body of substantially unatomized and unvaporized liquid fuel, substantially prior to the time of ignition, to the central area of said piston top intercepted by said axis of circulation and in the path of the circulating working fluid at its locus of minimum linear velocity whereby said fuel is minimally vaporized by said working fluid prior to the time of combustion; an ignition chamber separate from said combustion space; means for supplying an ignitable fuel-air mixture to said ignition chamber; spark ignition means in said ignition chamber for igniting said mixture; and wall means formng a connecting passage, between said ignition chamber and said combustion space, from which the ignition flame issues as a jet stream, said passage being oriented to direct said jet to impinge directly and forcefully on said liquid fuel body on said central piston area and thereby to progressively vaporize said fuel and displace the fuel vapors as they are formed into the air in said combustion space to progressively form a fuel-air mixture, and to ignite said mixture as it is formed to produce a progressively surface type combustion.

7. An apparatus as in claim 6 which includes the combination of: liquid fuel injection means opening into said combustion space oriented to inject fuel onto the central area of said piston top in a path substantially along said axis of circulation of said working fluid; and control means associated with said fuel injection means to vary the time of fuel injection between early in the intake cycle to the in the compression cycle to vary the time said fuel is held on said piston top and thereby to vary the time the fuel is subjected to heat in the presence of air and vary the amount of pre-combustion reactions induced.

8. An apparatus as in claim 7 which includes the combination of: intake manifold means in direct communication with said ignition chamber; a first fuel supply means for providing a substantially stoichiometric fuel-air mixture to said intake manifold; a second fuel supply means for injecting liquid fuel directly into said ignition chamber; air flow control means in said intake manifold; fuel flow control means for said second fuel supply means coordinated with said air flow control means to supply a substantially stoichiometric proportion of fuel and air to said ignition chamber; and fuel flow control means for said first fuel supply means and coordinated with said second fuel supply means whereby said first fuel supply means may be cut off while said second fuel supply is delivering fuel to said ignition chamber, and vice versa.

9. An apparatus as in claim 8 which includes the combination of: a first control means associated with said second fuel supply means for said ignition chamber to vary the time of fuel injection between late in the intake cycle to late in the compression cycle to vary the time said fuel is heated prior to combustion in said ignition chamber and to actuate said control means for said first and said second fuel supply means for said ignition chamber, whereby said first fuel supply means in operative from late in the intake cycle to early in the intake cycle; and a second control means to coordinate the time of fuel injection of fuel into said engine onto said piston top and into said ignition chamber by said second fuel supply means so that both fuel injections occur at substantially the same time in the engine cycle.

10. An apparatus as in claim 7 which includes the combination of: a liquid fuel injection valve in combination with said fuel injection means for admitting fuel to said combustion space; a movable member, actuated by hydraulic fluid at high pressure, connected to said injection valve and communicating with an enclosed cavity; elastic spring means to hold said valve means closed; a first conduit means, including a restrictive orifice, for admitting hydraulic fluid at high pressure into said enclosed cavity; a second conduit means for conveying said hydraulic fluid from said cavity; and control valve means in combination with said second conduit means for opening and closing said conduit, whereby said fuel injection valve is opened when said control valve is closed and is closed when said control valve is open.

11. An apparatus as in claim 6 which includes the combination of: liquid fuel injection means opening into said ignition chamber; and fuel nozzle means in said injector oriented to direct said liquid fuel in a substantially unatomized stream through said connecting passage between said ignition chamber and said combustion space, to impinge on said piston top.

12. An apparatus as in claim 6 which includes the combination of: liquid fuel injection means opening into said ignition chamber; fuel nozzle means in said injector oriented to direct said liquid fuel in a substantially unatomized stream from said ignition chamber through said connecting passage and said combustion space onto said piston top; and a wall of said connecting passage positioned and oriented to intercept said fuel stream obliquely to redirect said stream and retain a portion of said fuel on said wall wetted by said fuel, whereby said injected fuel is divided into two portions, of which said retained portion is subsequently vaporized to provide fuel for said ignition chamber.

13. In the operation of an internal combustion engine of the spark ignition, surface combustion type, in which an ignitable fuel-air mixture, formed prior to ignition, is ignited by spark ignition means and the resulting flame is directed forcefully as a jet of flaming gases from a partially confined ignition chamber against a substantially liquid body of fuel which has been deposited on a wall of the combustion space of said engine substantially in advance of the time of ignition and in the presence of the working fluid of said engine which is composed of air and residual exhaust gases and is independent of said ignitable fuel-air mixture, the method of operating said engine and supplying fuel thereto, which includes as steps: providing an ignitable fuel-air mixture in said ignition chamber prior to ignition; depositing additional fuel, in substantially liquid form, on a surface in said combustion space in a region separate from said ignition means and said fuel-air mixture at a time prior to at least a substantial portion of the compression cycle and in a zone in said space swept by gases which contain air for supporting combustion and which have minimum velocity whereby vaporization of said fuel, prior to combustion, is minimized; igniting said fuel-air mixture; directing the resulting ignition flame substantially normally onto said liquid fuel in a forceful stream, thence radially outward and around in a toroidal circulation in said combustion space to heat and vaporize said fuel from the fuel surface exposed to said flame; displacing said fuel vapors from said surface by said flame as they are formed to mix with said air; and igniting said fuel vapor and air mixture, as it is formed with said flame.

14. In the operation of an internal combustion engine of the spark ignition, surface combustion type, in which an ignitable fuel-air mixture, formed prior to ignition, is ignited by spark ignition means and the resulting flame is directed forcefully as a jet of flaming gases from a partially confined ignition chamber against a substantially liquid body of fuel which has been deposited on a wall of the combustion space of said engine substantially in advance of the time of ignition and in the presence of the working fluid of said engine which is composed of air and residual exhaust gases and is independent of said ignitable fuel-air mixture, the method of supplying the fuel for the ignitable fuel-air mixture and the liquid fuel for the fuel body on the wall of the combustion space from a single body of injected liquid fuel, which includes as steps: injecting a single body of fuel in liquid form in a substantially non-atomized stream into the combustion space of said engine; intercepting said fuel stream obliquely with a wall surface of limited area, whereby said surface is wetted, at least in part, with said fuel and the remainder of said stream of fuel is deflected to flow on from said wall surface in a continuing stream in a different direction than that of the initially injected stream; intercepting said remainder of said stream on a different wall surface in said combustion space to provide said fuel in liquid form; and vaporizing at least a portion of said fuel on said fuel wetted surface and mixing said fuel vapors with air in said partially confined ignition chamber to provide said ignitable fuel-air mixture.

References Cited

UNITED STATES PATENTS

| | | | |
|---|---|---|---|
| 3,315,650 | 4/1967 | Bishop et al. | 123—32 |
| 3,318,292 | 5/1967 | Hideg | 123—32 |
| 3,363,611 | 1/1968 | Von Seggern et al. | |
| 2,161,743 | 6/1939 | Heinrich et al. | 123—140.3 |
| 2,466,321 | 4/1949 | MacKensie | 123—32 |
| 2,652,039 | 9/1953 | Weslake. | |
| 2,658,487 | 11/1953 | Basabe | 123—30.21 |
| 2,884,913 | 5/1959 | Heintz. | |
| 2,983,268 | 5/1961 | Heintz. | |
| 1,354,786 | 10/1920 | Tartrais | 123—32 |
| 1,414,384 | 5/1922 | Tartrais | 123—32 |
| 1,643,396 | 9/1927 | Trussell | 123—75 |
| 2,534,346 | 12/1950 | Fenney | 123—32 |
| 2,877,754 | 3/1959 | Roosa | 123—139.13 |
| 2,886,023 | 5/1959 | Holley et al. | 123—139.15 |
| 3,079,901 | 3/1963 | Hallberg | 123—32 |
| 3,107,656 | 10/1963 | Meurer | 123—32 |
| 3,113,561 | 12/1963 | Heintz | 123—65 |
| 3,196,859 | 7/1965 | Ziegler | 123—139.13 |
| 3,238,930 | 3/1966 | Von Seggern et al. | 123—32 |
| 3,244,159 | 4/1966 | Meurer | 123—32 |
| 3,255,739 | 6/1966 | Von Seggern et al. | 123—32 |
| 3,302,627 | 2/1967 | Morris | 123—32 |

LAURENCE M. GOODRIDGE, *Primary Examiner.*

U.S. Cl. X.R.

123—75, 119